United States Patent [19]

Vanmaele

[11] Patent Number: 5,438,122
[45] Date of Patent: Aug. 1, 1995

[54] TRIAZENE DYES FOR USE IN THERMAL TRANSFER PRINTING

[75] Inventor: Luc Vanmaele, Lochristi, Belgium

[73] Assignee: AGFA-Gevaert, N.V., Mortsel, Belgium

[21] Appl. No.: 294,358

[22] Filed: Aug. 23, 1994

Related U.S. Application Data

[62] Division of Ser. No. 61,568, May 17, 1993, Pat. No. 5,356,857.

[51] Int. Cl.$^6$ ............................................. C09B 26/06
[52] U.S. Cl. ..................................... 534/551; 534/555
[58] Field of Search ......................................... 534/551

[56] References Cited

U.S. PATENT DOCUMENTS 3,932,633  1/1976  O e Brien et al. ................... 534/551

FOREIGN PATENT DOCUMENTS 46-35630  10/1971  Japan .................................... 534/551
48-20819  3/1973  Japan .................................... 534/551
1482911  5/1989  U.S.S.R. .................................. 534/551

OTHER PUBLICATIONS

Rondestvedt, Jr. et al., J. Org. Chem., 22, 200–203 (1957).
Shusterman et al., Mol. Pharmacol., 36(6), 934–944 (1989).

*Primary Examiner*—Patricia L. Morris
*Assistant Examiner*—Fiona T. Powers
*Attorney, Agent, or Firm*—Breiner & Breiner

[57] ABSTRACT

The present invention provides triazene dyes according to formula (I) for use in thermal transfer printing:

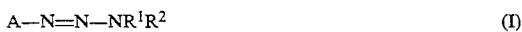

$$A-N=N-NR^1R^2 \qquad (I)$$

wherein A is the residue of a diazotisable heteroaromatic amine, $R^1$ and $R^2$ independently represent hydrogen, an alkyl group, a substituted alkyl group, an alkenyl group, a substituted alkenyl group, an aryl group, a substituted aryl group, a cycloalkyl group, a substituted cycloalkyl group, an aralkyl group, or $R^1$ and $R^2$ represent the atoms necessary to complete a ring system or a substituted ring system.

1 Claim, No Drawings

TRIAZENE DYES FOR USE IN THERMAL TRANSFER PRINTING

This is a division of application Ser. No. 08/061,568 filed May 17, 1993 now U.S. Pat. No. 5,356,857.

FIELD OF THE INVENTION

The present invention relates to dye-donor elements for use according to thermal dye sublimation transfer and to novel dyes for use in said dye-donor elements.

BACKGROUND OF THE INVENTION

Thermal dye sublimation transfer is a recording method in which a dye-donor element provided with a dye layer containing sublimable dyes having heat transferability is brought into contact with a receiver sheet or receiver element and selectively, in accordance with a pattern information signal, is heated by means of a thermal printing head provided with a plurality of juxtaposed heat-generating resistors, whereby dye is transferred from the selectively heated regions of the dye-donor element to the receiver sheet and forms a pattern thereon, the shape and density of which are in accordance with the pattern and intensity of heat applied to the dye-donor element.

A dye-donor element for use according to thermal dye sublimation transfer usually comprises a very thin support e.g. a polyester support, one side of which is covered with a dye layer comprising the printing dyes. Usually, an adhesive or subbing layer is provided between the support and the dye layer. Normally, the opposite side is covered with a slipping layer that provides a lubricated surface against which the thermal printing head can pass without suffering abrasion. An adhesive layer may be provided between the support and the slipping layer.

The dye layer can be a monochromic dye layer or it may comprise sequential repeating areas of differently coloured dyes e.g. dyes having a cyan, magenta, yellow, and optionally black hue. When a dye-donor element containing three or more primary colour dyes is used, a multicolour image can be obtained by sequentially performing the dye transfer process steps for each colour.

A primary coloured dye layer e.g. a magenta or cyan or yellow dye layer may comprise only one primary coloured dye (a magenta, cyan or yellow dye respectively) or may comprise a mixture of two or more primary color dyes of the same hue (two magenta, two cyan or two yellow dyes respectively).

Any dye can be used in such a dye layer provided it is easily transferable to the dye-image-receiving layer of the receiver sheet or element by the action of heat.

Typical and specific examples of dyes for use in thermal dye sublimation transfer have been described in e.g. EP 209,990, EP 209,991, EP 216,483, EP 218,397, EP 227,095, EP 227,096, EP 229,374, EP 235,939, EP 247,737, EP 257,577, EP 257,580, EP 258,856, EP 279,330, EP 279,467, EP 285,665, U.S. Pat. Nos. 4,743,582, 4,753,922, 4,753,923, 4,757,046, 4,769,360, 4,771,035, 5,026,677, JP 84/78,894, JP 84/78,895, JP 84/78,896, JP 84/227,490, JP 84/227,948, JP 85/27,594, JP 85/30,391, JP 85/229,787, JP 85/229,789, JP 85/229,790, JP 85/229,791, JP 85/229,792, JP 85/229,793, JP 85/229,795, JP 86/41,596, JP 86/268,493, JP 86/268,494, JP 86/268,495, and JP 86/284,489.

In spite of the many dyes that already exist, there is still a continuous search for novel dyes and especially for dyes that are suited for use in dye-donor elements for thermal dye sublimation transfer printing.

SUMMARY OF THE INVENTION

It is therefore an object of the present invention to provide novel dye-donor elements for use according to thermal dye sublimation transfer printing.

It is another object of the present invention to provide novel dyes that can be used in said dye-donor elements.

Other objects will become apparent from the description hereinafter.

In accordance with the present invention a dye-donor element for use according to thermal dye sublimation transfer is provided, said dye-donor element comprising a support having thereon a dye layer comprising at least one dye, wherein said at least one dye corresponds to the following general formula (I):

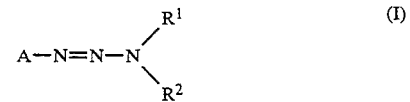

wherein A is the residue of a diazotisable heteroaromatic amine, $R^1$ and $R^2$ independently represent hydrogen, an alkyl group, a substituted alkyl group, an alkenyl group, a substituted alkenyl group, an aryl group, a substituted aryl group, a cycloalkyl group, a substituted cycloalkyl group, an aralkyl group, or $R^1$ and $R^2$ together represent the atoms necessary to complete a ring system or a substituted ring system.

The present invention also provides a method of forming an image by image-wise heating a dye-donor element comprising a support having thereon a dye layer comprising a binder and at least one dye as defined above and causing transfer of the image-wise heated dye to a receiver sheet.

DETAILED DESCRIPTION OF THE INVENTION

Preferred diazotisable heteroaromatic amines A—$NH_2$ are those in which A is selected from thiazolyl, benzothiazolyl, isothiazolyl, benzoisothiazolyl, thienyl, pyridinyl, imidazolyl, benzimidazolyl, pyrazolyl, oxazolyl, thiadiazolyl, triazolyl, quinolyl, isoquinolyl, pyridoisothiazolyl, benzoxazolyl, isoxazolyl, benzoisoxazolyl, pyrrolyl, and isothiadiazolyl, The residue, A, of the heteroaromatic amine, A—$NH_2$, may be substituted by non-ionic groups, preferably those which are free from acidic hydrogen atoms, unless these are positioned so that they form intramolecular hydrogen bonds.

Examples of suitable substituents are cyano, nitro, halogen, such as fluoro, chloro, bromo, alkyl, alkoxy, alkylthio, aryloxy, arylthio, formyl (—CHO), carboalkoxy, such as carbomethoxy, carboethoxy, tricyanovinyl (—C(CN)=C(CN)$_2$), —CH=CZ$^1$Z$^2$ where $Z^1$ and $Z^2$ independently represent an electron withdrawing group such as e.g. CN, carboalkoxy group, a carbonamido group, a carbonyl group etc., —SCN, an amino group such as e.g. dimethylamino, diethylamino, piperidino, pyrrolidino etc..

Preferably $R^1$ and $R^2$ independently represent methyl, ethyl, propyl, isopropyl, butyl, sec. butyl, tert.

butyl, isobutyl, cyclopentyl, cyclohexyl, benzyl, a phenyl group substituted, preferentially in ortho and/or para, with methyl, ethyl, halogen, $NO_2$, CN, $SO_2CH_3$, alkoxy such as methoxy, alkylthio e.g. methylthio, dialkylamino, such as dimethylamino and diethylamino, carboalkoxy such as carbomethoxy, carboethoxy, or $R^1$ and $R^2$ together represent the necessary atoms for completing a substituted or unsubstituted heterocyclic ring e.g. as listed above for A, e.g. a substituted tetrahydroquinoline ring, a tetrahydroisoquinoline ring, an imidazolyl ring, a pyrazolyl ring, a pyrazolidine ring, a pyrazoline ring, etc.

According to a preferred embodiment, the dyes of the present invention correspond to the following general formula (II):

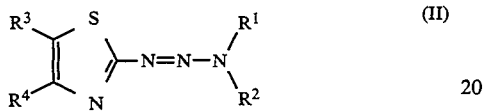

(II)

wherein $R^1$ and $R^2$ have the same meaning as defined in the above general formula I;

$R^3$ represents hydrogen, CN or $R^5$—C=B $R^4$ represents hydrogen, halogen, CN, a substituted or unsubstituted alkyl or aryl group, an amino group, or Z—$R^6$; Z represents O, S, or $SO_2$; or $R^3$ and $R^4$ together represent the atoms necessary for completing a substituted or unsubstituted alicyclic, aromatic or heteroaromatic ring;

B represents O, N—$R^7$, $CR^8R^9$, $R^5$ represents hydrogen, a substituted or unsubstituted alkyl, a substituted or unsubstituted aryl, an aryloxy group, an alkoxy group, such as methoxy or ethoxy, a alkylthio group, an amino group, an electron withdrawing group, e.g. CN, a halogen, a carboxylic ester, an amide e.g. carboxylamide, a sulphonate, a phosphonate, a carbonyl group, a nitro group or $R^5$ and $R^8$, $R^9$ or $R^7$ together represent the necessary atoms for completing a substituted or unsubstituted ring system, $R^6$ represents hydrogen, substituted or unsubstituted alkyl, substituted or unsubstituted aryl, substituted or unsubstituted cycloalkyl, CN;

$R^7$ represents H, CN, $NR^{10}R^{11}$, $OR^{10}$, $OCOR^{10}$, $OCO_2R^{10}$, $OCONR^{10}R^{11}$, $OSO_2R^{10}$, OP(O) $(OR^{10})(OR^{11})$, substituted or unsubstituted alkyl, substituted or unsubstituted aryl, substituted or unsubstituted cycloalkyl, a substituted or unsubstituted heterocyclic ring;

$R^8$ and $R^9$ independently represent a substituted or unsubstituted heterocyclic ring e.g. as defined for A hereinbefore or an electron withdrawing group e.g. CN, a carboxylic ester, an amide e.g. carboxylamide, a sulphonate, a phosphonate, a carbonyl group, a nitro group or $R^8$ and $R^9$ together represent the necessary atoms for completing a substituted or unsubstituted ring system;

$R^{10}$ and $R^{11}$ independently represent hydrogen, substituted or unsubstituted alkyl, substituted or unsubstituted aryl, substituted or unsubstituted cycloalkyl, a substituted or unsubstituted heterocyclic ring e.g. as defined for A hereinbefore, or $R^{10}$ and $R^{11}$ together represent the atoms necessary for completing a heterocyclic nucleus or a substituted heterocyclic nucleus.

Representatives of novel dyes corresponding to general formula (II) are listed in Table 1 hereinafter.

TABLE 1

| Dye | $R^1$ | $R^2$ | $R^3$ | $R^4$ |
|---|---|---|---|---|
| T.1 | $C_4H_9$ | $C_6H_5$ | CHO | Cl |
| T.2 | $C_4H_9$ | $C_6H_5$ | CHO | $OCH_3$ |
| T.3 | $C_4H_9$ | $C_6H_5$ | CH=$NOCH_3$ | $OCH_3$ |
| T.4 | $C_4H_9$ | $C_6H_4p.CH_3$ | CHO | Cl |
| T.5 | $C_4H_9$ | $C_6H_4p.CH_3$ | CHO | $OCH_3$ |
| T.6 | $C_4H_9$ | $C_6H_4p.CH_3$ | CH=$NOCH_3$ | $OCH_3$ |
| T.7 | $C_4H_9$ | $C_6H_4p.CH_3$ | CH=NOH | $OCH_3$ |
| T.8 | $C_4H_9$ | $C_6H_4p.CH_3$ | CN | $OCH_3$ |
| T.9 | $C_4H_9$ | $C_6H_4p.CH_3$ | CH=$NOC_4H_9$ | $OCH_3$ |
| T.10 | $C_4H_9$ | $C_6H_4p.N(C_2H_5)_2$ | CHO | Cl |
| T.11 | $C_4H_9$ | $C_6H_4p.N(C_2H_5)_2$ | CHO | $OCH_3$ |
| T.12 | $C_4H_9$ | $C_6H_4p.CH_3$ | CH=$C(CN)_2$ | $OCH_3$ |
| T.13 | $C_4H_9$ | $C_6H_4p.CH_3$ | CH=$C(CN)_2$ | $OCH_3$ |
| T.14 | $C_4H_9$ | $C_6H_4p.CH_3$ | H | $m.NO_2$—$C_6H_4$ |
| T.15 | $C_4H_9$ | $C_6H_4p.CH_3$ | *CH=CH—CH=CH* | |
| T.16 | $C_4H_9$ | $C_6H_4p.CH_3$ | CH=C—C=$C(CN)_2$<br>         \|  \|<br>        CN $NH_2$ | $OCH_3$ |
| T.17 | $C_4H_9$ | $C_6H_4p.CH_3$ | TCVV | $OCH_3$ |
| T.18 | $C_4H_9$ | mDMePh | CH=C—C=$C(CN)_2$<br>         \|  \|<br>        CN $NH_2$ | $OCH_3$ |
| T.19 | $C_4H_9$ | mDMePh | CN | $OCH_3$ |
| T.20 | $C_4H_9$ | mDMePh | CH=N—OH | $OCH_3$ |
| T.21 | $C_4H_9$ | mDMePh | C(CN)=$C(CN)_2$ | $OCH_3$ |
| T.22 | $C_4H_9$ | mDMePh | CH=$C(CN)_2$ | $OCH_3$ |
| T.23 | $C_4H_9$ | mDMePh | CH=$C(CN)CO_2CH_3$ | $OCH_3$ |

TABLE 1-continued

| Dye | R¹ | R² | R³ | R⁴ |
|---|---|---|---|---|
| T.24 | $C_4H_9$ | mDMePh | CHO | $OCH_3$ |
| T.25 | $C_4H_9$ | mDMePh | CHO | Cl |
| T.26 | $C_4H_9$ | mDMeOPh | CHO | Cl |
| T.27 | $C_4H_9$ | mDMeOPh | CHO | $OCH_3$ |
| T.28 | $C_4H_9$ | $C_6H_4p.OCH_3$ | CHO | Cl |
| T.29 | $C_4H_9$ | $C_6H_4p.OCH_3$ | CHO | $OCH_3$ |
| T.30 | $C_2H_5$ | $C_6H_4p.OCH_3$ | CHO | Cl |
| T.31 | $C_2H_5$ | $C_6H_4p.OCH_3$ | CHO | $OCH_3$ |
| T.32 | $C_2H_5$ | $C_6H_4p.OCH_3$ | $C(CN)=C(CN)_2$ | $OCH_3$ |
| T.33 | $C_2H_5$ | $C_6H_4p.OCH_3$ | CN | $OCH_3$ |
| T.34 | $C_4H_9$ | $C_6H_4p.CH_3$ | CH=C(CN)−C(N($CO_2i.C_4H_9$)$_2$)=C(CN)$_2$ | $OCH_3$ |
| T.35 | $C_4H_9$ | $C_6H_4p.SO_2CH_3$ | CHO | Cl |
| T.36 | $C_4H_9$ | $C_6H_4p.SO_2CH_3$ | CHO | $OCH_3$ |
| T.37 | $C_4H_9$ | $C_6H_4p.SO_2CH_3$ | $CH=C(CN)_2$ | $OCH_3$ |
| T.38 | $C_4H_9$ | $C_6H_4p.SO_2CH_3$ | $C(CN)=C(CN)_2$ | $OCH_3$ |
| T.39 | $C_4H_9$ | $C_6H_4p.SO_2CH_3$ | CN | $OCH_3$ |
| T.40 | $C_4H_9$ | $C_6H_4p.SO_2CH_3$ | $CH=C(CN)CO_2CH_3$ | $OCH_3$ |
| T.41 | $C_4H_9$ | $C_6H_4p.SO_2CH_3$ | $CH=N-OCH_3$ | $OCH_3$ |
| T.42 | $C_4H_9$ | $C_6H_4p.SO_2CH_3$ | TCVV | $OCH_3$ |
| T.43 | $C_4H_9$ | $C_6H_4p.NO_2$ | CHO | Cl |
| T.44 | $C_4H_9$ | $C_6H_4p.NO_2$ | CHO | $OCH_3$ |
| T.45 | $C_4H_9$ | $C_6H_4p.NO_2$ | CN | $OCH_3$ |
| T.46 | $C_4H_9$ | $C_6H_4p.NO_2$ | $CH=C(CN)_2$ | $OCH_3$ |
| T.47 | $C_4H_9$ | $C_6H_4p.NO_2$ | $C(CN)=C(CN)_2$ | $OCH_3$ |
| T.48 | $C_4H_9$ | $C_6H_4p.NO_2$ | $CH=NOCH_3$ | $OCH_3$ |
| T.49 | $C_4H_9$ | $C_6H_4p.CH_3$ | CN | CN |
| T.50 | $C_4H_9$ | $C_6H_4p.CH_3$ | vBzDK | Cl |
| T.51 | $C_4H_9$ | $C_6H_4p.CH_3$ | vBzDCN | Cl |
| T.52 | $C_4H_9$ | $C_6H_4p.CH_3$ | vBzTCN | Cl |
| T.53 | $C_4H_9$ | $C_6H_4p.CH_3$ | vBzDK | $OCH_3$ |
| T.54 | $C_4H_9$ | $C_6H_4p.CH_3$ | vBzDCN | $OCH_3$ |
| T.55 | $C_4H_9$ | $C_6H_4p.CH_3$ | vBzTCN | $OCH_3$ |
| T.56 | $C_4H_9$ | $C_6H_4p.CH_3$ | $CH=NOOCCH_3$ | $OCH_3$ |
| T.57 | $C_4H_9$ | $C_6H_4p.CH_3$ | $CH=C(CN)CONHCH_3$ | $OCH_3$ |
| T.58 | $C_4H_9$ | $C_6H_4p.CH_3$ | $C(CN)=C(CN)COOCH_3$ | $OCH_3$ |
| T.59 | $C_4H_9$ | $C_6H_4p.CH_3$ | CHO | $SC_6H_5$ |
| T.60 | $C_4H_9$ | $C_6H_4p.CH_3$ | $CH=C(CN)_2$ | $SC_6H_5$ |
| T.61 | $C_4H_9$ | $C_6H_4p.CH_3$ | $C(CN)=C(CN)_2$ | $SC_6H_5$ |
| T.62 | $C_4H_9$ | $C_6H_4p.CH_3$ | $CH=NOCH_3$ | $SC_6H_5$ |
| T.63 | $C_4H_9$ | $C_6H_4p.CH_3$ | CN | $SC_6H_5$ |
| T.64 | $C_4H_9$ | $C_6H_4p.CH_3$ | vBzSDCN | $OCH_3$ |
| T.65 | $NR_1R_2$ = BzPy | | CHO | $OCH_3$ |
| T.66 | $NR_1R_2$ = Dz | | CHO | $OCH_3$ |
| T.67 | $NR_1R_2$ = BzPyr | | CHO | $OCH_3$ |
| T.68 | $NR_1R_2$ = BzIs | | CHO | $OCH_3$ |
| T.69 | $CH(CH_3)C_2H_5$ | $C_6H_4p.CH_3$ | CHO | Cl |
| T.70 | $CH(CH_3)C_2H_5$ | $C_6H_4p.CH_3$ | CHO | $OCH_3$ |
| T.71 | $CH(CH_3)C_2H_5$ | $C_6H_4p.CH_3$ | $CH=NOCH_3$ | $OCH_3$ |
| T.72 | $CH(CH_3)C_2H_5$ | $C_6H_4p.CH_3$ | CN | $SC_6H_5$ |
| T.73 | $CH_2CH(CH_3)_2$ | mDMePh | CN | $OCH_3$ |
| T.74 | $C_4H_9$ | $C_6H_4p.CH_3$ | CH=C(CN)−C(NHCO$_2$CH$_2$CH(CH$_3$)$_2$)=C(CN)$_2$ | $OCH_3$ |
| T.75 | $C_4H_9$ | mDMePh | TCVV | $OCH_3$ |
| T.76 | $C_4H_9$ | $C_6H_4.pCH_3$ | $CO_2C_2H_5$ | $OC_2H_5$ |
| T.77 | $C_4H_9$ | $C_6H_4.pCH_3$ | CHO | $OC_3H_7$ |
| T.78 | $C_4H_9$ | $C_6H_4.pCH_3$ | CHO | $N(C_3H_7)_2$ |
| T.79 | $C_4H_9$ | $C_6H_4.pCH_3$ | $CO_2C_2H_5$ | Az |
| T.80 | $C_4H_9$ | $C_6H_4.pCH_3$ | CN | Az |
| T.81 | $C_4H_9$ | $C_6H_4.pCH_3$ | CHO | $SO_2CH_3$ |
| T.82 | $C_4H_9$ | $C_6H_4.pCH_3$ | CH=C(CN)−C(NHCO$_2$−i.C$_4$H$_9$)=C(CN)$_2$ | $OCH_3$ |

The symbols used in the above table and also used in the following tables have the following meaning:

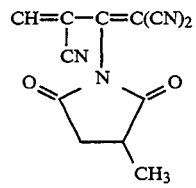 TCVV

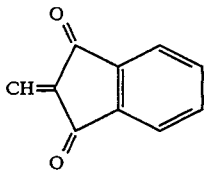 vBzDK

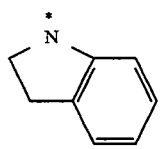 BzPyr

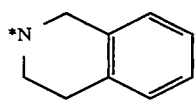 BzIs

 Az

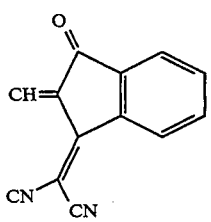 vBzDCN

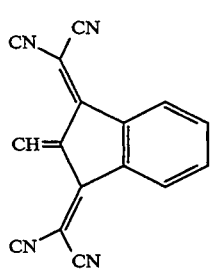 vBzTCN

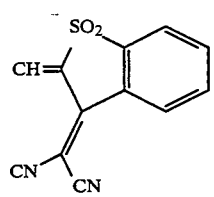 vBzSDCN

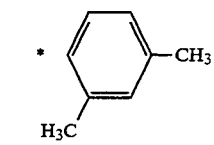 mDMePh

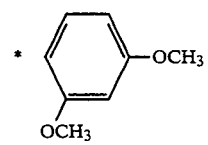 mDMeOPh

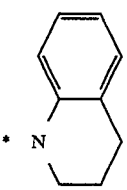 BzPy

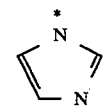 Dz

\* denotes the bonding position.

According to another embodiment, the dyes of the present invention can be represented by the following general formula (III):

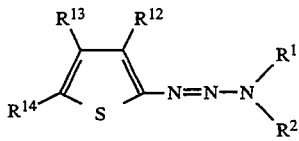 (III)

wherein $R^1$ and $R^2$ have the same meaning as defined hereinbefore and $R^{12}$ is H, CN, or an electron withdrawing group e.g. as listed above $R^{13}$ is H, halogen, an alkoxy group, an alkyl group, an aryl group, an amino group, an acylamido group, CN, an alkylthio group, an arylthio group, $CO_2R^{10}$, $CONR^{10}R^{11}$, $SO_2R^{10}$, $SO_3R^{10}$, $SO_2NR^{10}R^{11}$, a substituted or unsubstituted heterocyclic group, such as defined for A hereinbefore, a cycloalkoxy group, an aryloxy group;

$R^{14}$ is H, CN, alkyl, aryl, halogen $NO_2$, $SO_2R^{15}$, $SO_3R^{15}$ or $R^5$—C=B as defined hereinbefore;

$R^{12}$ and $R^{13}$ or $R^{13}$ and $R^{14}$ may together represent the necessary atoms for completing a substituted or unsubstituted ring system including fused on ring systems;

B, $R^5$, $R^{10}$ and $R^{11}$ are as defined hereinbefore;

$R^{15}$ may have one of the significances given for $R^{10}$

Representatives of novel dyes corresponding to general formula (III) are listed in Table 2 hereinafter.

TABLE 2

$$R^{13}\diagdown R^{12}\diagup\text{(thiophene ring with S)}\diagup R^{14}\diagdown N=N-N\diagup R^1\diagdown R^2$$

| Dye | $R^1$ | $R^2$ | $R^{12}$ | $R^{14}$ | $R^{13}$ |
|---|---|---|---|---|---|
| F.1 | $C_4H_9$ | $C_6H_5$ | CN | CHO | Cl |
| F.2 | $C_4H_9$ | $C_6H_5$ | CN | CHO | $OCH_3$ |
| F.3 | $C_4H_9$ | $C_6H_5$ | CN | $CH=NOCH_3$ | $OCH_3$ |
| F.4 | $C_4H_9$ | $C_6H_4p.CH_3$ | CN | CHO | Cl |
| F.5 | $C_4H_9$ | $C_6H_4p.CH_3$ | CN | CHO | $OCH_3$ |
| F.6 | $C_4H_9$ | $C_6H_4p.CH_3$ | CN | $CH=NOCH_3$ | $OCH_3$ |
| F.7 | $C_4H_9$ | $C_6H_4p.CH_3$ | CN | $CH=NOH$ | $OCH_3$ |
| F.8 | $C_4H_9$ | $C_6H_4p.CH_3$ | CN | CN | $OCH_3$ |
| F.9 | $C_4H_9$ | $C_6H_4p.CH_3$ | CN | $CH=NOC_4H_9$ | $OCH_3$ |
| F.10 | $C_4H_9$ | $C_6H_4p.N(C_2H_5)_2$ | CN | CHO | Cl |
| F.11 | $C_4H_9$ | $C_6H_4p.N(C_2H_5)_2$ | CN | CHO | $OCH_3$ |
| F.12 | $C_4H_9$ | $C_6H_4p.CH_3$ | CN | $CH=C(CN)_2$ | $OCH_3$ |
| F.13 | $C_4H_9$ | $C_6H_4p.CH_3$ | CN | $C(CN)=C(CN)_2$ | $OCH_3$ |
| F.14 | $C_4H_9$ | $C_6H_4p.CH_3$ | $CO_2CH_3$ | CHO | $CH_3$ |
| F.15 | $C_4H_9$ | $C_6H_4p.CH_3$ | $CO_2CH_3$ | $CO_2CH_3$ | $CH_3$ |
| F.16 | $C_4H_9$ | $C_6H_4p.CH_3$ | CN | $CH=C(CN)-C(NH_2)=C(CN)_2$ | $OCH_3$ |
| F.17 | $C_4H_9$ | $C_6H_4p.CH_3$ | CN | TCVV | $OCH_3$ |
| F.18 | $C_4H_9$ | mDMePh | CN | $CH=C(CN)-C(NH_2)=C(CN)_2$ | $OCH_3$ |
| F.19 | $C_4H_9$ | mDMePh | CN | CN | $OCH_3$ |
| F.20 | $C_4H_9$ | mDMePh | CN | $CH=N-OH$ | $OCH_3$ |
| F.21 | $C_4H_9$ | mDMePh | CN | $C(CN)=C(CN)_2$ | $OCH_3$ |
| F.22 | $C_4H_9$ | mDMePh | CN | $CH=C(CN)_2$ | $OCH_3$ |
| F.23 | $C_4H_9$ | mDMePh | CN | $CH=C(CN)CO_2CH_3$ | $OCH_3$ |
| F.24 | $C_4H_9$ | mDMePh | CN | CHO | $OCH_3$ |
| F.25 | $C_4H_9$ | mDMePh | CN | CHO | Cl |
| F.26 | $C_4H_9$ | mDMeOPh | CN | CHO | Cl |
| F.27 | $C_4H_9$ | mDMeOPh | CN | CHO | $OCH_3$ |
| F.28 | $C_4H_9$ | $C_6H_4p.OCH_3$ | CN | CHO | Cl |
| F.29 | $C_4H_9$ | $C_6H_4p.OCH_3$ | CN | CHO | $OCH_3$ |
| F.30 | $C_2H_5$ | $C_6H_4p.OCH_3$ | CN | CHO | Cl |
| F.31 | $C_2H_5$ | $C_6H_4p.OCH_3$ | CN | CHO | $OCH_3$ |
| F.32 | $C_2H_5$ | $C_6H_4p.OCH_3$ | CN | $C(CN)=C(CN)_2$ | $OCH_3$ |
| F.33 | $C_2H_5$ | $C_6H_4p.OCH_3$ | CN | CN | $OCH_3$ |
| F.34 | $C_4H_9$ | $C_6H_4p.CH_3$ | CN | $CH=C(CN)-C(N(CO_2i.C_4H_9)_2)=C(CN)_2$ | $OCH_3$ |
| F.35 | $C_4H_9$ | $C_6H_4p.SO_2CH_3$ | CN | CHO | Cl |
| F.36 | $C_4H_9$ | $C_6H_4p.SO_2CH_3$ | CN | CHO | $OCH_3$ |
| F.37 | $C_4H_9$ | $C_6H_4p.SO_2CH_3$ | CN | $CH=C(CN)_2$ | $OCH_3$ |
| F.38 | $C_4H_9$ | $C_6H_4p.SO_2CH_3$ | CN | $C(CN)=C(CN)_2$ | $OCH_3$ |
| F.39 | $C_4H_9$ | $C_6H_4p.SO_2CH_3$ | CN | CN | $OCH_3$ |
| F.40 | $C_4H_9$ | $C_6H_4p.SO_2CH_3$ | CN | $CH=C(CN)CO_2CH_3$ | $OCH_3$ |
| F.41 | $C_4H_9$ | $C_6H_4p.SO_2CH_3$ | CN | $CH=N-OCH_3$ | $OCH_3$ |
| F.42 | $C_4H_9$ | $C_6H_4p.SO_2CH_3$ | CN | TCVV | $OCH_3$ |
| F.43 | $C_4H_9$ | $C_6H_4p.NO_2$ | CN | CHO | Cl |
| F.44 | $C_4H_9$ | $C_6H_4p.NO_2$ | CN | CHO | $OCH_3$ |
| F.45 | $C_4H_9$ | $C_6H_4p.NO_2$ | CN | CN | $OCH_3$ |
| F.46 | $C_4H_9$ | $C_6H_4p.NO_2$ | CN | $CH=C(CN)_2$ | $OCH_3$ |
| F.47 | $C_4H_9$ | $C_6H_4p.NO_2$ | CN | $C(CN)=C(CN)_2$ | $OCH_3$ |
| F.48 | $C_4H_9$ | $C_6H_4p.NO_2$ | CN | $CH=NOCH_3$ | $OCH_3$ |
| F.49 | $C_4H_9$ | $C_6H_4p.CH_3$ | CN | CN | CN |
| F.50 | $C_4H_9$ | $C_6H_4p.CH_3$ | CN | vBzDK | Cl |
| F.51 | $C_4H_9$ | $C_6H_4p.CH_3$ | CN | vBzDCN | Cl |
| F.52 | $C_4H_9$ | $C_6H_4p.CH_3$ | CN | vBzTCN | Cl |
| F.53 | $C_4H_9$ | $C_6H_4p.CH_3$ | CN | vBzDK | $OCH_3$ |
| F.54 | $C_4H_9$ | $C_6H_4p.CH_3$ | CN | vBzDCN | $OCH_3$ |
| F.55 | $C_4H_9$ | $C_6H_4p.CH_3$ | CN | vBzTCN | $OCH_3$ |
| F.56 | $C_4H_9$ | $C_6H_4p.CH_3$ | CN | $CH=NOOCCH_3$ | $OCH_3$ |
| F.57 | $C_4H_9$ | $C_6H_4p.CH_3$ | CN | $CH=C(CN)CONHCH_3$ | $OCH_3$ |
| F.58 | $C_4H_9$ | $C_6H_4p.CH_3$ | CN | $CH=C(CN)CONHCH_3$ | $OCH_3$ |
| F.59 | $C_4H_9$ | $C_6H_4p.CH_3$ | $CO_2CH_3$ | CHO | Cl |
| F.60 | $CH(CH_3)C_2H_5$ | $C_6H_4p.CH_3$ | $CO_2C_2H_5$ | CHO | Cl |

TABLE 2-continued

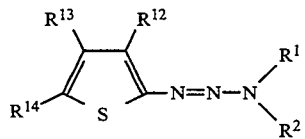

| Dye | R¹ | R² | R¹² | R¹⁴ | R¹³ |
|---|---|---|---|---|---|
| F.61 | $C_4H_9$ | $C_6H_4p.CH_3$ | CN | CHO | $OC_2H_5$ |
| F.62 | $C_4H_9$ | $C_6H_4p.CH_3$ | CN | $CH=C(CN)_2$ | $OC_2H_5$ |

According to another preferred embodiment the dyes of the present invention can be represented by the following general formula (IV):

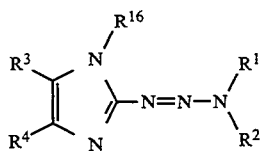

(IV)

wherein $R^1$, $R^2$, $R^3$ and $R^4$ have a significance as defined hereinbefore and $R^{16}$ represents hydrogen, substituted or unsubstituted alkyl, substituted or unsubstituted aryl, substituted or unsubstituted cycloalkyl, a substituted or unsubstituted heterocyclic ring;

$R^3$ and $R^{16}$ together may represent the necessary atoms for completing a substituted or unsubstituted ring system, including fused-on ring systems.

Representatives of novel dyes corresponding to general formula (IV) are listed in Table 3 hereinafter.

TABLE 3

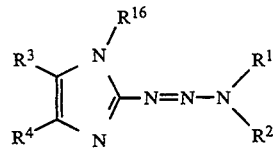

| Dye | R¹ | R² | R³ | R⁴ | R¹⁶ |
|---|---|---|---|---|---|
| I.1 | $C_4H_9$ | $C_6H_5$ | CHO | Cl | $CH_3$ |
| I.2 | $C_4H_9$ | $C_6H_5$ | CHO | $OCH_3$ | $CH_3$ |
| I.3 | $C_4H_9$ | $C_6H_5$ | $CH=NOCH_3$ | $OCH_3$ | $CH_3$ |
| I.4 | $C_4H_9$ | $C_6H_4p\ CH_3$ | CHO | Cl | $CH_3$ |
| I.5 | $C_4H_9$ | $C_6H_4p\ CH_3$ | CHO | $OCH_3$ | $CH_3$ |
| I.6 | $C_4H_9$ | $C_6H_4p\ CH_3$ | $CH=NOCH_3$ | $OCH_3$ | $CH_3$ |
| I.7 | $C_4H_9$ | $C_6H_4p.CH_3$ | $CH=NOH$ | $OCH_3$ | $CH_3$ |
| I.8 | $C_4H_9$ | $C_6H_4p.CH_3$ | CN | $OCH_3$ | $CH_3$ |
| I.9 | $C_4H_9$ | $C_6H_4p.CH_3$ | $CH=NOC_4H_9$ | $OCH_3$ | $CH_3$ |
| I.10 | $C_4H_9$ | $C_6H_4p.N(C_2H_5)_2$ | CHO | Cl | $CH_3$ |
| I.11 | $C_4H_9$ | $C_6H_4p.N(C_2H_5)_2$ | CHO | $OCH_3$ | $CH_3$ |
| I.12 | $C_4H_9$ | $C_6H_4p\ CH_3$ | $CH=C(CN)_2$ | $OCH_3$ | $CH_3$ |
| I.13 | $C_4H_9$ | $C_6H_4p.CH_3$ | $C(CN)=C(CN)_2$ | $OCH_3$ | $CH_3$ |
| I.14 | $C_4H_9$ | $C_6H_4p.CH_3$ | CHO | $OC_2H_5$ | $CH_3$ |
| I.15 | $C_4H_9$ | $C_6H_4p.CH_3$ | CHO | Cl | $CH(CH_3)C_2H_5$ |
| I.16 | $C_4H_9$ | $C_6H_4p.CH_3$ | $CH=C(CN)-C(NH_2)=C(CN)_2$ | $OCH_3$ | $CH_3$ |
| I.17 | $C_4H_9$ | $C_6H_4p.CH_3$ | TCVV | $OCH_3$ | $CH_3$ |
| I.18 | $C_4H_9$ | mDMePh | $CH=C(CN)-C(NH_2)=C(CN)_2$ | $OCH_3$ | $CH_3$ |
| I.19 | $C_4H_9$ | mDMePh | CN | $OCH_3$ | $CH_3$ |
| I.20 | $C_4H_9$ | mDMePh | $CH=N-OH$ | $OCH_3$ | $CH_3$ |
| I.21 | $C_4H_9$ | mDMePh | $C(CN)=C(CN)_2$ | $OCH_3$ | $CH_3$ |
| I.22 | $C_4H_9$ | mDMePh | $CH=C(CN)_2$ | $OCH_3$ | $CH_3$ |
| I.23 | $C_4H_9$ | mDMePh | $CH=C(CN)CO_2CH_3$ | $OCH_3$ | $CH_3$ |
| I.24 | $C_4H_9$ | mDMePh | CHO | $OCH_3$ | $CH_3$ |
| I.25 | $C_4H_9$ | mDMePh | CHO | Cl | $CH_3$ |
| I.26 | $C_4H_9$ | mDMeOPh | CHO | Cl | $CH_3$ |
| I.27 | $C_4H_9$ | mDMeOPh | CHO | $OCH_3$ | $CH_3$ |
| I.28 | $C_4H_9$ | $C_6H_4p.OCH_3$ | CHO | Cl | $CH_3$ |
| I.29 | $C_4H_9$ | $C_6H_4p.OCH_3$ | CHO | $OCH_3$ | $CH_3$ |
| I.30 | $C_2H_5$ | $C_6H_4p.OCH_3$ | CHO | Cl | $CH_3$ |
| I.31 | $C_2H_5$ | $C_6H_4p.OCH_3$ | CHO | $OCH_3$ | $CH_3$ |
| I.32 | $C_2H_5$ | $C_6H_4p.OCH_3$ | $C(CN)=C(CN)_2$ | $OCH_3$ | $CH_3$ |
| I.33 | $C_2H_5$ | $C_6H_4p.OCH_3$ | CN | $OCH_3$ | $CH_3$ |

TABLE 3-continued

Structure: R³ and R⁴ on a ring with N, R¹⁶ on N, connected via -N=N-N(R¹)(R²)

| Dye | R¹ | R² | R³ | R⁴ | R¹⁶ |
|---|---|---|---|---|---|
| I.34 | C₄H₉ | C₆H₄p.CH₃ | CH=C(CN)—C(N(CO₂i.C₄H₉)₂)=C(CN)₂ | OCH₃ | CH₃ |
| I.35 | C₄H₉ | C₆H₄p.SO₂CH₃ | CHO | Cl | CH₃ |
| I.36 | C₄H₉ | C₆H₄p.SO₂CH₃ | CHO | OCH₃ | CH₃ |
| I.37 | C₄H₉ | C₆H₄p.SO₂CH₃ | CH=C(CN)₂ | OCH₃ | CH₃ |
| I.38 | C₄H₉ | C₆H₄p.SO₂CH₃ | C(CN)=C(CN)₂ | OCH₃ | CH₃ |
| I.39 | C₄H₉ | C₆H₄p.SO₂CH₃ | CN | OCH₃ | CH₃ |
| I.40 | C₄H₉ | C₆H₄p.SO₂CH₃ | CH=C(CN)CO₂CH₃ | OCH₃ | CH₃ |
| I.41 | C₄H₉ | C₆H₄p.SO₂CH₃ | CH=N—OCH₃ | OCH₃ | CH₃ |
| I.42 | C₄H₉ | C₆H₄p.SO₂CH₃ | TCVV | OCH₃ | CH₃ |
| I.43 | C₄H₉ | C₆H₄p.NO₂ | CHO | Cl | CH₃ |
| I.44 | C₄H₉ | C₆H₄p.NO₂ | CHO | OCH₃ | CH₃ |
| I.45 | C₄H₉ | C₆H₄p.NO₂ | CN | OCH₃ | CH₃ |
| I.46 | C₄H₉ | C₆H₄p.NO₂ | CH=C(CN)₂ | OCH₃ | CH₃ |
| I.47 | C₄H₉ | C₆H₄p.NO₂ | C(CN)=C(CN)₂ | OCH₃ | CH₃ |
| I.48 | C₄H₉ | C₆H₄p.NO₂ | CH=NOCH₃ | OCH₃ | CH₃ |
| I.49 | C₄H₉ | C₆H₄p.CH₃ | CN | CN | CH₃ |
| I.50 | C₄H₉ | C₆H₄p.CH₃ | vBzDK | Cl | CH₃ |
| I.51 | C₄H₉ | C₆H₄p.CH₃ | vBzDCN | Cl | CH₃ |
| I.52 | C₄H₉ | C₆H₄p.CH₃ | vBzTCN | Cl | CH₃ |
| I.53 | C₄H₉ | C₆H₄p.CH₃ | vBzDK | OCH₃ | CH₃ |
| I.54 | C₄H₉ | C₆H₄p.CH₃ | vBzDCN | OCH₃ | CH₃ |
| I.55 | C₄H₉ | C₆H₄p.CH₃ | vBzTCN | OCH₃ | CH₃ |
| I.56 | C₄H₉ | C₆H₄p.CH₃ | CH=NOOCCH₃ | OCH₃ | CH₃ |
| I.57 | C₄H₉ | C₆H₄p.CH₃ | CH=C(CN)CONHCH₃ | OCH₃ | CH₃ |
| I.58 | C₄H₉ | C₆H₄p.CH₃ | CH=C(CN)COOCH₃ | OCH₃ | CH₃ |
| I.59 | C₄H₉ | C₆H₄p.CH₃ | CHO | SC₆H₅ | CH₃ |
| I.60 | C₄H₉ | C₆H₄p.CH₃ | CH=C(CN)₂ | SC₆H₅ | CH₃ |
| I.61 | C₄H₉ | C₆H₄p.CH₃ | C(CN)=C(CN)₂ | SC₆H₅ | CH₃ |
| I.62 | C₄H₉ | C₆H₄p.CH₃ | CH=NOCH₃ | SC₆H₅ | CH₃ |
| I.63 | C₄H₉ | C₆H₄p.CH₃ | CN | SC₆H₅ | CH₃ |
| I.64 | C₄H₉ | C₆H₄p.CH₃ | vBzSDCN | OCH₃ | CH₃ |
| I.65 | NR¹R² = BzPy | | CHO | OCH₃ | CH₃ |
| I.66 | NR¹R² = Dz | | CHO | OCH₃ | CH₃ |
| I.67 | NR¹R² = BzPyr | | CHO | OCH₃ | CH₃ |
| I.68 | NR¹R² = BzIS | | CHO | OCH₃ | CH₃ |
| I.69 | CH(CH₃)C₂H₅ | C₆H₄p.CH₃ | CHO | Cl | CH₃ |
| I.70 | CH(CH₃)C₂H₅ | C₆H₄p.CH₃ | CHO | OCH₃ | CH₃ |
| I.71 | CH(CH₃)C₂H₅ | C₆H₄p.CH₃ | CH=NOCH₃ | OCH₃ | CH₃ |
| I.72 | CH(CH₃)C₂H₅ | C₆H₄p.CH₃ | CN | SC₆H₅ | CH₃ |
| I.73 | CH₂CH(CH₃)₂ | mDMePh | CN | OCH₃ | CH₃ |
| I.74 | C₄H₉ | mDMePh | CHO | Cl | C₂H₅ |
| I.75 | C₄H₉ | mDMePh | CH=NOCH₃ | Cl | C₂H₅ |
| I.76 | C₄H₉ | C₆H₄.pCH₃ | CHO | OC₃H₇ | CH₃ |
| I.77 | C₄H₉ | C₆H₄.pCH₃ | CHO | N(C₃H₇)₂ | CH₃ |

The dyes shown in table 3 wherein R³ is CHO and R⁴ is Cl are advantageously prepared from the following intermediate:

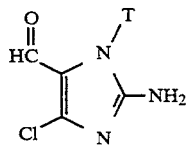

wherein T represents an alkyl or aryl group.

The other dyes listed in table 3 may then be derived from the dyes prepared using the above intermediate. Preparation of the above intermediate proceeds according to the preparation examplified in example 12 (see below).

Other examples of triazene dyes corresponding to general formula I are given in Table 4.

TABLE 4

E.1: Structure with thiadiazole ring (H₃C, S, N—N) connected via —N=N—N(C₄H₉)— to C₆H₄—CH₃ (para)

E.2: Structure with isoxazole ring (H₃C, H₃C, N—O) connected via —N=N—N(CH₃)— to C₆H₄—COOCH₃ (para)

TABLE 4-continued

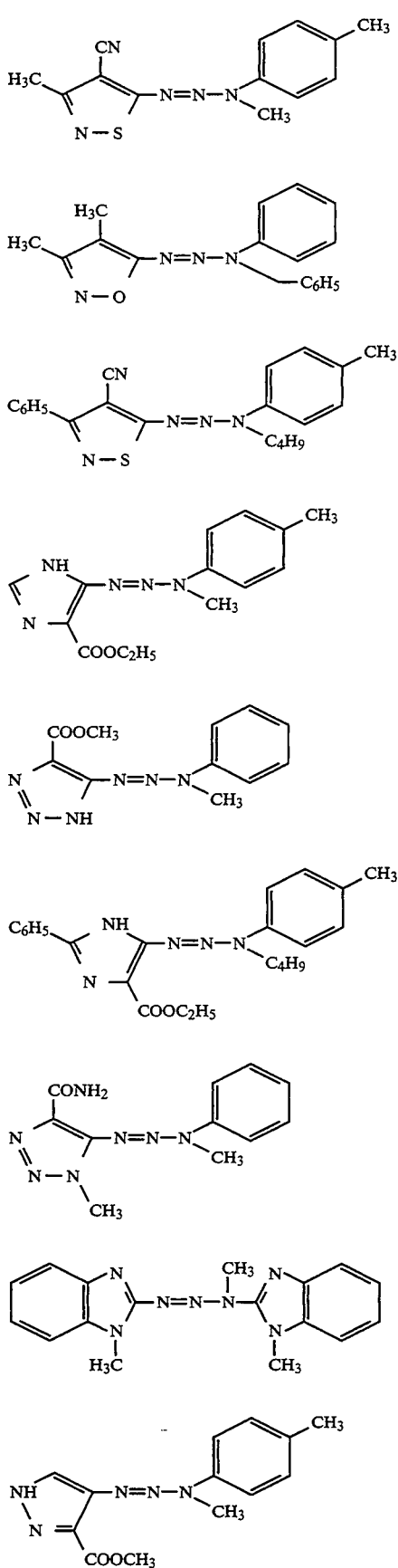

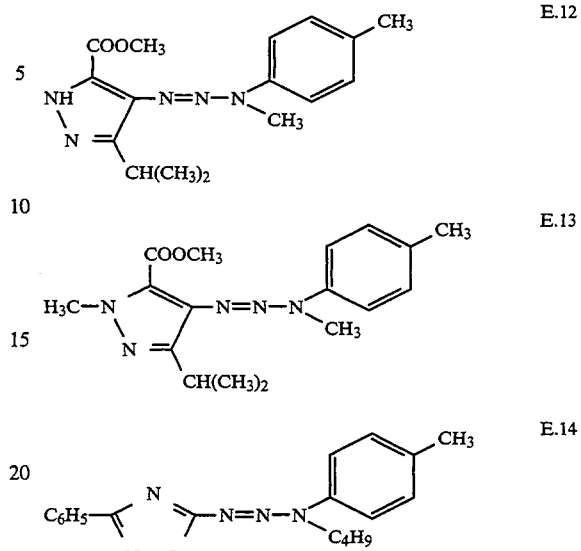

The dyes of the present invention have a cyan, magenta, or yellow hue or absorb in the UV or IR-region, and have a good solubility in ecologically acceptable organic solvents such as e.g. ethyl acetate and ethyl methyl ketone.

The dyes of the present invention, according to general formula I, can be prepared by coupling of the diazotised heteroaromatic amine, A—$NH_2$, with the appropriate amine $HNR^1R^2$. These triazene dyes can be modified further using synthetic methods known to those who are skilled in the art of organic synthesis. The synthesis of dyes according to general formula II to IV will become apparent from the examples given below. The synthesis of other triazene dyes according to general formula I, such as those described in Table 4, proceeds according to methods described in Chem. Ber. 93, 963 (1960); 91, 2095 (1958); 94, 2043 (1961); J.Med.-Chem., 9, 733 (1966); 14 (12), 1245 (1971); Chem. Pharm. Bull. 25, 731 (1977); Offenlegungsschrift DE 1945430 (Offenlegungstag 19/3/70) to 3M, Offenlegungsschrift DE 2161209 (Offenlegungstag 22.6.72) to Beechem Group LTD, U.S. Pat. Nos. 3,654,257 (1972); 3,649,613 (1972); 4,137,227 (1979); Helvetica Chimica Acta, 62 (5), 1570 (1979); J.Chem.Soc. Perkin Trans. I, 247 (1988); J.Org. Chem., 27, 2150 (1962).

The dyes can be used as filter dyes e.g. for silver halide colour photographic materials and also as antihalation dyes. They can be used in inkjet printing, resistive ribbon printing, in inks e.g. for laser applications, in textile, in lacquers, and in paints. They can also be used for transfer printing on fabrics and for constructing filter array elements.

According to a preferred embodiment of the present invention the dyes are used in the dye layer of a dye-donor element for thermal dye sublimation transfer.

To improve the stability of the dyes to light, the use of a metal complex of the dye e.g. a Ni or Co complex is also effective.

The dye layer is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed has a thickness of about 0.2 to 5.0 μm, preferably 0.4 to 2.0 μm, and the amount ratio of dye to binder ranges from 9:1 to 1:3 by weight, preferably from 2:1 to 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, cellulose nitrate, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic. Preferably, the binder for the dye layer of the present invention comprises cellulose acetate butyrate or copolystyrene-acrylonitrile.

The dyes in accordance with the present invention may be used in admixture with other known dyes for thermal sublimation printing. In particular they can be used in combination with tricyano- and dicyanovinyl dyes as disclosed in EP92203566, EP92203208 and with malononitrile dimer derived dyes as disclosed in EP-A-400706. The present dyes may also be used in admixture with azo dyes e.g. disperse azo dyes, anthraquinone dyes, indoaniline dyes, azomethine dyes. Examples of dyes that can be used in combination with the dyes of the present invention are disclosed in e.g. EP92203979, EP 209,990, EP 209,991, EP 216,483, EP 218,397, EP 227,095, EP 227,096, EP 229,374, EP 235,939, EP 247,737, EP 257,577, EP 257,580, EP 258,856, EP 279,330, EP 279,467, EP 285,665, U.S. Pat. Nos. 4,743,582, 4,753,922, 4,753,923, 4,757,046, 4,769,360, 4,771,035, 5,026,677, JP 84/78,894, JP 84/78,895, JP 84/78,896, JP 84/227,490, JP 84/227,948, JP 85/27,594, JP 85/30,391, JP 85/229,787, JP 85/229,789, JP 85/229,790, JP 85/229,791, JP 85/229,792, JP 85/229,793, JP 85/229,795, JP 86/41,596, JP 86/268,493, JP 86/268,494, JP 86/268,495, JP 86/284,489, U.S. Pat. Nos. 4,839,336, 5,168,094, 5,147,844, 5,177,052, 5,175,069, 5,155,088, 5,166,124, 5,166,129, 5,166,128, 5,134,115, 5,132,276, 5,132,275, 5,132,274, 5,132,273, 5,132,268, 5,132,267, 5,126,314, 5,126,313, 5,126,312, 5,126,311, 5,134,116, 4,975,410, 4,885,272, 4,886,029 etc..

The coating layer may also contain other additives, such as curing agents, preservatives, organic or inorganic fine particles, dispersing agents, antistatic agents, defoaming agents, viscosity-controlling agents, these and other ingredients having been described more fully in EP 133,011, EP 133,012, EP 111,004, and EP 279,467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper and condenser paper. Preference is given to a support comprising polyethylene terephthalate. In general, the support has a thickness of 2 to 30 μm. The support may also be coated with an adhesive or subbing layer, if desired.

The dye layer of the dye-donor element may be coated on the support or printed thereon by a printing technique such as a gravure process.

A dye barrier layer comprising a hydrophilic polymer may also be employed between the support and the dye layer of the dye-donor element to enhance the dye transfer densities by preventing wrong-way transfer of dye backwards to the support. The dye barrier layer may contain any hydrophilic material that is useful for the intended purpose. In general, good results have been obtained with gelatin, polyacrylamide, polyisopropyl acrylamide, butyl methacrylate-grafted gelatin, ethyl methacrylate-grafted gelatin, ethyl acrylate-grafted gelatin, cellulose monoacetate, methylcellulose, polyvinyl alcohol, polyethyleneimine, polyacrylic acid, a mixture of polyvinyl alcohol and polyvinyl acetate, a mixture of polyvinyl alcohol and polyacrylic acid, or a mixture of cellulose monoacetate and polyacrylic acid. Suitable dye barrier layers have been described in e.g. EP 227,091 and EP 228,065. Certain hydrophilic polymers e.g. those described in EP 227,091 also have an adequate adhesion to the support and the dye layer, so that the need for a separate adhesive or subbing layer is avoided. These particular hydrophilic polymers used in a single layer in the dye-donor element thus perform a dual function, hence are referred to as dye barrier/subbing layers.

Preferably the reverse side of the dye-donor element has been coated with a slipping layer to prevent the printing head from sticking to the dye-donor element. Such a slipping layer would comprise a lubricating material such as a surface-active agent, a liquid lubricant, a solid lubricant or mixtures thereof, with or without a polymeric binder. The surface-active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$–$C_{20}$ aliphatic acids. Examples of liquid lubricants include silicone oils, synthetic oils, saturated hydrocarbons, and glycols. Examples of solid lubricants include various higher alcohols such as stearyl alcohol, fatty acids and fatty acid exters. Suitable slipping layers have been described in e.g. EP 138,483, EP 227,090, U.S. Pat. Nos. 4,567,113, 4,572,860, 4,717,711. Preferably the slipping layer comprises a styrene-acrylonitrile copolymer or a styrene-acrylonitrile-butadiene copolymer or a mixture thereof or a polycarbonate as described in EP-A-527520 as binder and a polysiloxane-polyether copolymer or polytetrafluoroethylene or a mixture thereof as lubicrant in an amount of 0.1 to 10% by weight of the binder or binder mixture.

The support for the receiver sheet that is used with the dye-donor element may be a transparent film of e.g. polyethylene terephthalate, a polyether sulfone, a polyimide, a cellulose ester or a polyvinyl alcohol-co-acetal. The support may also be a reflective one such as a baryta-coated paper, polyethylene-coated paper or white polyester i.e. white-pigmented polyester. Blue-coloured polyethylene terephthalate film can also be used as support.

To avoid poor adsorption of the transferred dye to the support of the receiver sheet or receiver element this support must be coated with a special layer called dye-image-receiving layer, into which the dye can diffuse more readily. The dye-image-receiving layer may comprise e.g. a polycarbonate, a polyurethane, a polyester, a polyamide, polyvinyl chloride, polystyrene-co-arcylonitrile, polycaprolactone, or mixtures thereof. The dye-image receiving layer may also comprise a heat-cured product of poly(vinyl chloride/co-vinyl acetate/co-vinyl alcohol) and polyisocyanate. Suitable dye-image-receiving layers have been described in e.g. EP 133,011, EP 133,012, EP 144,247, EP 227,094, and EP 228,066.

In order to improve the light-fastness and other stabilities of recorded images UV-absorbers, singlet oxygen quenchers such as HALS-compounds (Hindered Amine Light Stabilizers) and/or antioxidants can be incorporated into the dye-image-receiving layer.

The dye layer of the dye-donor element or the dye-image-receiving layer of the receiver sheet or receiver element may also contain a releasing agent that aids in separating the dye-donor element from the receiver sheet after transfer. The releasing agents can also be incorporated in a separate layer on at least part of the dye layer and/or of the dye-image-receiving layer. Suitable releasing agents are solid waxes, fluorine- or phosphate-containing surface-active agents and silicone oils. Suitable releasing agents have been described in e.g. EP 133,012, JP 85/19,138, and EP 227,092.

The dye-donor elements according to the invention are used to form a dye transfer image, which process comprises placing the dye layer of the dye-donor element in face-to-face relation with the dye-image-receiving layer of the receiver sheet or receiver element and image-wise heating from the back of the dye-donor element. The transfer of the dye is accomplished by heating for about several milliseconds at a temperature of 400° C.

When the process is performed for but one single colour, a monochromic dye transfer image is obtained. A multicolour image can be obtained by using a dye-donor element containing three or more primary colour dyes and sequentially performing the process steps described above for each colour. The above sandwich of dye-donor element and receiver sheet is formed on three occasions during the time when heat is applied by the thermal printing head. After the first dye has been transferred, the elements are peeled apart. A second dye-donor element (or another area of the dye-donor element with a different dye area) is then brought in register with the dye-receiving element and the process is repeated. The third colour and optionally further colours are obtained in the same manner.

In addition to thermal heads, laser light, infrared flash, or heated pens can be used as the heat source for supplying heat energy. Thermal printing heads that can be used to transfer dye from the dye-donor elements of the present invention to a receiver sheet are commercially available. In case laser light is used, the dye layer or another layer of the dye element has to contain a compound that absorbs the light emitted by the laser and converts it into heat e.g. carbon black.

Alternatively, the support of the dye-donor element may be an electrically resistive ribbon consisting of e.g. a multilayer structure of a carbon-loaded polycarbonate coated with a thin aluminium film. Current is injected into the resistive ribbon by electrically addressing a printing head electrode resulting in highly localized heating of the ribbon beneath the relevant electrode. The fact that in this case the heat is generated directly in the resistive ribbon and that it is thus the ribbon that gets hot leads to an inherent advantage in printing speed using the resistive ribbon/electrode head technology as compared to the thermal head technology, according to which the various elements of the thermal head get hot and must cool down before the head can move to the next printing position.

The following examples illustrate the invention in more detail without, however, limiting the scope thereof.

EXAMPLE 1

Synthesis of dye T.4

Dye T.4 is prepared according to scheme 1. The starting materials A and B can be prepared according to literature procedures known to those who are skilled in the art of organic synthesis, e.g. U.S. Pat. No. 4,395,544 for the preparation of A.

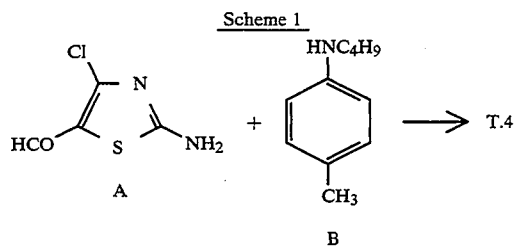

58 ml of nitrosylsulphuric acid is added to a suspension of 41 g of product A in 320 g of phosphoric acid over one hour at 0° C. The orange syrup is stirred for another hour.

This sirup is added at −5° C. to a solution of 41 g of product B in 400 ml of THF, 400 ml of acetic acid and 500 g of ice. The suspension is stirred for 30 minutes. A satured solution of 700 g of sodium acetate trihydrate in water is added over one hour and stirred further for 30 minutes. 1000 ml of water is added and the precipitated dye is filtered to obtain 75 g of dye T.4.

EXAMPLE 2

Synthesis of dye T.5

45 ml (0.24 mole; 3 equivalents) of a sodium methoxide solution in methanol is added to a suspension of 27.5 g of dye T.4 in 300 ml of methanol. The suspension is heated to 55° C. for 3 hours. The solution is cooled to 0° C. and filtered. The precipitate is washed with cold methanol and water. The product is purified by column chromatography to obtain 16 g of pure dye T.5 (mp. 170° C.).

EXAMPLE 3

Synthesis of T.6

1.67 g of methoxylamine hydrochloride and 2.8 ml of triethylamine are dissolved in 50 ml of methanol. 3.32 g of dye T.5 is added and the solution is heated to 55° C. for 30 minutes. After cooling the precipitate is filtered and crystallized from methanol to obtain 2.1 g of dye T.6 (mixture of isomers; mp. 117° C.).

EXAMPLE 4

Synthesis of T.7

3.5 g of hydroxylamine hydrochloride and 7.0 ml of triethylamine are dissolved in 150 ml of methanol. 8.3 g of dye T.5 is added and the solution is heated to 55° C. for one hour. After cooling the precipitate is filtered and stirred in a mixture of methanol/water/acetic acid. After filtration the product is dried to obtain 8 g of dye T.7 (mixture of isomers; mp. 165° C.).

EXAMPLE 5

Synthesis of T.8

1.2 g of carbonyldiimidazole is added to a suspension of 2.5 g of dye T.7 in dichloromethane and the suspension is refluxed for one hour. After concentration under reduced pressure the residue is crystallized from methanol to obtain 1.6 g of dye T.8 (mp. 141° C.).

EXAMPLE 6

Synthesis of dye T.12

0.05 ml of triethylamine is added to a solution of 3.32 g of dye T.5 and 0.7 g of malononitrile in 30 ml of dichloromethane. The red solution is stirred for 4 hours at 30° C. and then concentrated under reduced pressure. The residue is crystallized from methanol to obtain 3.35 g of pure dye T.12 (mp. 170° C.).

EXAMPLE 7

Synthesis of dye T.13

0.45 g of potassium cyanide is added to a solution of 1.9 g of dye T.12 in 20 ml of DMSO, followed by 1.27 g of iodine. The solution is stirred for 15 minutes at 30° C. The solution is poured into 100 ml of methanol/ice (1/1) and stirred for 15 minutes. The precipitate is filtered and washed with methanol/water (1/1). After drying at 40° C. 1.5 g of dye T.13 is obtained (mp. 210° C.).

EXAMPLE 8

Synthesis of dye T.14

11.5 ml of nitrosylsulphuric acid is added over one hour to a suspension of 11.1 g of 2-amino-4-(meta-nitrophenyl)-thiazole in 70 g of phosphoric acid, at 0° C. The suspension is stirred for one hour at 0° C. The yellow sirup is added at −2° C. to a solution of 8.5 g of product B (example 1) in 50 ml of THF, 50 ml of acetic acid and 300 g of ice, while simultaneously a saturated solution of 138 g of sodium acetate in water is added. The suspension is stirred at 5° C. for one hour. The precipitate is filtered and washed with water. After drying the product is purified by column chromatography to obtain 12.0 g of dye T.14 (mp. 142° C.).

EXAMPLE 9

Synthesis of dye T.16

16.6 g of dye T.5 and 8.0 g of malononitrile dimer are dissolved in 200 ml of dichloromethane and 50 ml of methanol. 2 ml of triethylamine is added and the solution is stirred for 24 hours at 20° C. The solution is concentrated under reduced pressure and the residue is crystallised from methanol to obtain 15.5 g of dye T.16 (mp. 144° C.).

EXAMPLE 10

Synthesis of dye F.4

Dye F.4 is prepared according to scheme 2. Starting material C can be prepared according to literature procedures such as DE 3738910.

Scheme 2

C + B (example 1) ⟶ F.4

60 ml of nitrosylsulphuric acid is added at 0° C. to a suspension of 47 g of product C in 320 g of phosphoric acid. The reaction mixture is stirred for one hour at 0° C. This solution of the diazonium salt is added at 0° C. to a mixture of 41 g of product B in 400 ml of acetic acid, 400 ml THF and 500 g of ice. The mixture is stirred for 30 minutes at 0° C. A solution of 700 g of sodium acetate trihydrate in 1 l of water is added at 0° C. and stirring is continued for one hour. The precipitate is filtered, washed with water and dried to obtain 80 g of dye F.4

EXAMPLE 11

Synthesis of dye F.5

Dye F.5 is prepared analogously to example 2. Dye F.5 can also be prepared according to scheme 2 (example 10) where product C is replaced by product D,

D which can be prepared according to EP 193885.

Synthesis of dye F.5

76.8 g of dye F.4 is suspended in 425 ml of methanol. 118.2 ml of a 30% solution of sodium methoxide in methanol is added and the reaction mixture is gently refluxed for 30 minutes. The solution is cooled to 5° C., filtered, washed with methanol and dried to obtain 44 g (58%) of dye F.5 (mp. 117° C.).

The preparation of the other dyes from Table 2 is analogous to the preparation of the dyes from Table 1.

EXAMPLE 12

Synthesis of dye I.4

Dye I.4 is prepared according to scheme 3.

Scheme 3

E ⟶ ⟶ I

-continued
Scheme 3

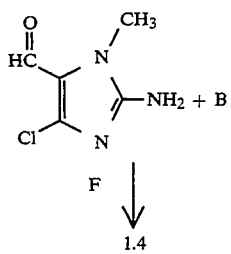

Preparation of compound F
(1-methyl-2-amino-4-chloro-5-formylimidazole)

200 ml of DMF is cooled to −10° C. 57 ml of POCl$_3$ is added while stirring and keeping the temperature to less than 5° C. The solution is stirred for 15 min. and cooled to −5° C. 22.6 g of creatinine (compound E) is added in four portions with intervals of 15 min. and maintaining the temperature at less than 5° C. The solution is then heated for 1.5 hours at 83° C. and subsequently cooled to 5° C. The reaction mixture is poured into a mixture of 483 g of sodium acetate trihydrate in 1 l of ice/water. The suspension is stirred overnight. The obtained precipitate is filtered, washed with water and dried to obtain 31.5 g (73%) of intermediate I (4-chloro-2- dimethylaminomethyleneamino-5-formyl-1-methylimidazole). The product can be recrystallized from ethanol (mp. 125° C.).

49 g of crystallized intermediate I is suspended in 600 ml of water and 20 ml of ethanol. 16.6 ml of 0.5N Hcl is added and the reaction mixture is stirred at 83° C. for 3 hours. 3.5 ml of concentrated HCl is added and stirring at 85° C. is continued for 2 hours. The suspension is cooled to 20° C. and the product is filtered, washed neutral and dried at 40° C. The orange product is crystallized by boiling in 250 ml of ethyl acetate. After filtration and drying 34 g (93 %) of pure compound F are obtained (mp. dec>210° C.).

Preparation of dye I.4

24 ml of nitrosylsulphuric acid is added at −2° C. to a suspension of 16 g of product F in 112 g of phosphoric acid. The reaction mixture is stirred for one hour at −2° C. This solution of the diazonium salt is added at 0° C. to a mixture of 16.3 g of product B in 300 ml of acetic acid, 100 ml THF and 1300 g of ice. The mixture is stirred for 30 minutes at 0° C. 138 g of sodium acetate trihydrate are added and the mixture is stirred for one hour at 0° C.

The product is filtered, washed neutral and dried. Dye I.4 is purified by column chromatography to obtain 15 g of pure compound (mp. 114° C.).

EXAMPLE 13

Synthesis of dye. I.5

3.34 g of dye I.4 is suspended in 20 ml of methanol at room temperature. 3.7 ml of a 30% solution of sodium methoxide in methanol is added and the mixture is stirred for 5 hours at 40° C. and for 4 hours at reflux. The reaction mixture is cooled and poured into a mixture of ice and acetic acid. The yellow precipitate is filtered and washed with water. The product is purified by column chromatography to obtain 1.4 g (42%) of pure dye I.5 (mp. 120° C.). The preparation of the other dyes from table 3 is analogous to the preparation of the dyes from table 1. Analogues to compound E can be prepared according to methods described in the chemical literature, e.g. Journal of Heterocyclic Chemistry, 9 (2), p203-205 (1972) and the references cited therein.

EXAMPLE 14

Synthesis of dye E.1

11 ml of nitrosylsulphuric acid is added at −5° C. over 30 minutes to a suspension of 5.75 g of 2-amino-5-methylthiadiazole in 30 ml of phosphoric acid. The suspension is stirred for 30 minutes at −2° C. and added at 0° C. to a mixture of 9.8 g of product B in 100 ml of acetic acid, 25 ml of THF and 100 g of ice. A solution of 250 g sodium acetate in 500 ml of water is added over 30 minutes and stirring is continued for 60 minutes. 500 ml of water is added and the precipitate is filtered, washed with water, dried and purified by column chromatography to obtain 3 g of dye E. 1 (mp. 158° C.).

EXAMPLE 15

The absorption maxima ($\lambda_{max}$) and molar extinction coefficients ($\epsilon$) of the dyes identified below were determined in methanol. The results are listed in table 5.

TABLE 5

| dye | $\lambda_{max}$ (nm) | $\epsilon$ (mol$^{-1}$ cm$^{-1}$ l) | |
|-----|---------------------|-------------------------------------|---|
| T.1 | 410 | 20572 | |
| T.2 | 425 | 19295 | |
| T.3 | 425 | 17372 | |
| T.4 | 408 | 22171 | |
| T.5 | 430 | 20728 | |
| T.6 | 425 | 18988 | |
| T.7 | 430 | 18216 | |
| T.8 | 410 | 18448 | |
| T.11 | 490 | 20579 | |
| T.12 | 493 | 52438 | |
| T.13 | 540 | 33490 | (CH$_2$Cl$_2$/CH$_3$OH; 1/1) |
| T.14 | 380 | 20672 | |
| T.15 | 377 | 26343 | |
| T.19 | 387 | 14520 | |
| T.34 | 592 | 39055 | |
| T.74 | 540 | 33012 | |
| T.18 | 484 | 28707 | |
| T.24 | 405 | 14205 | |
| T.22 | 469 | 28466 | |
| E.1 | 357 | 18785 | |
| T.29 | 435 | 19990 | |
| T.16 | 504 | — | |
| T.75 | 574 | 39911 | |
| T.37 | 486 | 25157 | (CH$_2$Cl$_2$/CH$_3$OH; 1/1) |
| I.4 | 376 | 29463 | |
| I.5 | 392 | 31074 | |
| I.12 | 456 | 55093 | |
| F.5 | 432 | 24069 | |
| T.36 | 428 | 18967 | |
| T.76 | 416 | 18880 | |
| T.37 | 486 | 25157 | (CH$_2$Cl$_2$/CH$_3$OH; 1/1) |

EXAMPLE 16

Receiver sheets were prepared by coating a polyethylene-coated paper support weighing 180 g with a dye-image-receiving layer from a solution in ethyl methyl ketone of 3,6 g/m$^2$ of poly(vinyl chloride/co-vinyl acetate/co-vinyl alcohol) (Vinylite VAGD supplied by Union Carbide), 0,336 g/m$^2$ of diisocyanate (Desmodur N3300 supplied by Bayer AG), and 0,2 g/m$^2$ of hydroxy-modified polydimethylsiloxane (Tegomer H SI 2111 supplied by Goldschmidt).

Dye-donor elements for use according to thermal dye sublimation transfer were prepared as follows:

A solution comprising 0.5% by weight of dye and 0.5% by weight of copoly(styrene-acrylonitrile) (Luran 388S, supplied by BASF, Germany) as binder in ethyl methyl ketone was prepared.

From this solution a dye layer having a wet thickness of 100 μm was coated on a polyethylene terephthalate film support having a thickness of 6 μm and carrying a conventional subbing layer. The resulting dye layer was dried by evaporation of the solvent.

The opposite side of the film support was coated with a subbing layer of a copolyester comprising ethylene glycol, adipic acid, neopentyl glycol, terephthalic acid, isophthalic acid, and glycerol.

The resulting subbing layer was covered with a solution in methyl ethyl ketone of 0.5 g/m² of a polycarbonate having the following structural formula to form a heat-resistant layer:

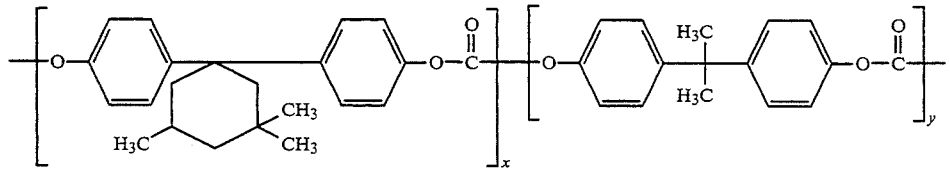

wherein x=55 mol % and y=45 mol %.

Finally, a top layer of polyether-modified polydimethylsiloxane (Tegoglide 410, Goldschmidt) was coated from a solution in isopropanol on the resulting heat-resistant polycarbonate layer.

The dye-donor element was printed in combination with a receiver sheet in a Mitsubishi colour video printer CP100E.

The receiver sheet was separated from the dye-donor element and the colour density value of the recorded image was measured by means of a Macbeth TR 924 densitometer in Status A mode.

The above described experiment was repeated for each of the dyes identified in Table 6 hereinafter.

TABLE 6

| Dye No. | Max. Dens. | Spectral absorption in Status A filter behind | | |
|---|---|---|---|---|
| | | Red | Green | Blue |
| T.1*,+ | 230 | 7 | 9 | 150 |
| T.2* | 236 | 8 | 24 | 150 |
| T.3 | 182 | 7 | 41 | 150 |
| T.5 | 198 | 7 | 28 | 150 |
| T.6 | 174 | 7 | 43 | 150 |
| T.8 | 191 | 6 | 15 | 150 |
| T.12 | 167 | 21 | 150 | 90 |
| T.13 | 161 | 56 | 150 | 35 |
| T.14 | 89 | 7 | 7 | 89 |
| T.15 | 111 | 6 | 7 | 111 |
| T.16 | 63 | 20 | 63 | 31 |
| T.18 | 85 | 11 | 85 | 57 |
| T.19 | 108 | 4 | 5 | 108 |
| T.22 | 146 | 7 | 120 | 146 |
| T.24 | 158 | 5 | 10 | 150 |
| T.29 | 231 | 7 | 37 | 150 |
| T.34 | 109 | 109 | 82 | 32 |
| T.36 | 82 | 4 | 12 | 82 |
| T.38 | 183 | 15 | 150 | 44 |
| T.75 | 91 | 91 | 84 | 16 |
| T.76 | 167 | 4 | 11 | 150 |
| T.82 | 97 | 62 | 97 | 30 |
| F.5 | 249 | 4 | 17 | 150 |

TABLE 6-continued

| Dye No. | Max. Dens. | Spectral absorption in Status A filter behind | | |
|---|---|---|---|---|
| | | Red | Green | Blue |
| I.4 | 78 | 4 | 5 | 78 |
| I.5 | 158 | 4 | 5 | 150 |

*Printed on Mitsubishi CK 100 S as receiving element
+cellulose acetate, butyrate used in donor element.

I claim:
1. A dye according to the following formula:

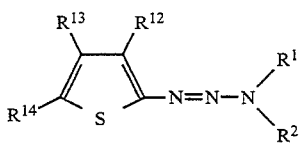

wherein $R^1$ and $R^2$ independently represent hydrogen, an alkyl group, an alkenyl group, and aryl group, a cycloalkyl group, an aralkyl group, or $R^1$ and $R^2$ together represent the atoms necessary to complete a ring system;

$R^{12}$ represents H or an electron withdrawing group $R^{13}$ represents H, halogen, an alkoxy group, an alkyl group, an aryl group, an acylamido group, CN, an alkylthio group, an arylthio group $CO_2R^{10}$, $CONR^{10}R^{11}$, $SO_2R^{10}$, $SO_3R^{10}$, $SO_2NR^{10}R^{11}$, a heterocyclic group, a cycloalkoxy group, an aryloxy group;

$R^{14}$ represents H, CN, alkyl, halogen, $NO_2$, $SO_2R^{15}$, $SO_3R^{15}$ or $R^5$—C=B;

B represents O, N—$R^7$ or $CR^8R^9$;

$R^7$ represents H, CN, $NR^{10}R^{11}$, $OR^{10}$, $OCOR^{10}$, $OCO_2R^{10}$, $OCONR^{10}R^{11}$, $OSO_2R^{10}$, $OP(O)(OR^{10})(OR^{11})$, alkyl, aryl, cycloalkyl, a heterocyclic ring;

$R^8$ and $R^9$ independently represent an electron withdrawing group or a heterocyclic ring or $R^8$ and $R^9$ together represent the necessary atoms for completing a ring system $R^{12}$ and $R^{13}$ or $R^{13}$ and $R^{14}$ may together represent the necessary atoms for completing a ring system including fused-on ring system;

$R^{10}$ and $R^{11}$ independently represent hydrogen, alkyl, aryl, cycloalkyl, a heterocyclic ring, or $R^{10}$ and $R^{11}$ together represent the atoms necessary for completing a heterocyclic nucleus;

$R^5$ represents hydrogen, alkyl, aryl, an electron withdrawing group, an aryloxy group, an alkoxy group, an alkylthio group, an amino group or $R^5$ and $R^8$, $R^9$ or $R^7$ together represent the necessary atoms for completing a ring system;

$R^{15}$ represents hydrogen, alkyl, aryl, cycloalkyl, a heterocyclic ring.

* * * * *